US009460100B2

(12) United States Patent
Obradovich

(10) Patent No.: US 9,460,100 B2
(45) Date of Patent: Oct. 4, 2016

(54) SYSTEM AND METHOD FOR AUDIO AND VIDEO PORTABLE PUBLISHING SYSTEM

(71) Applicant: Silver State Intellectual Technologies, Inc., Las Vegas, NV (US)

(72) Inventor: Michael L. Obradovich, Las Vegas, NV (US)

(73) Assignee: Silver State Intellectual Technologies, Inc., Las Vegas, NV (US)

( * ) Notice: Subject to any disclaimer, the term of this patent is extended or adjusted under 35 U.S.C. 154(b) by 164 days.

(21) Appl. No.: 14/295,008

(22) Filed: Jun. 3, 2014

(65) Prior Publication Data

US 2014/0289283 A1    Sep. 25, 2014

Related U.S. Application Data

(63) Continuation of application No. 11/225,245, filed on Sep. 12, 2005, now Pat. No. 8,745,132.

(60) Provisional application No. 60/608,631, filed on Sep. 10, 2004.

(51) Int. Cl.
| G06F 15/16 | (2006.01) |
| G06F 17/30 | (2006.01) |
| G11B 27/034 | (2006.01) |
| G11B 27/34 | (2006.01) |
| H04N 21/414 | (2011.01) |
| H04N 21/443 | (2011.01) |
| H04N 21/472 | (2011.01) |
| H04N 21/4788 | (2011.01) |
| H04N 21/482 | (2011.01) |
| H04N 21/488 | (2011.01) |
| H04W 88/02 | (2009.01) |

(52) U.S. Cl.
CPC ... *G06F 17/30117* (2013.01); *G06F 17/30056* (2013.01); *G11B 27/034* (2013.01); *G11B 27/34* (2013.01); *H04N 21/41407* (2013.01); *H04N 21/443* (2013.01); *H04N 21/472* (2013.01); *H04N 21/4788* (2013.01); *H04N 21/47205* (2013.01); *H04N 21/4825* (2013.01); *H04N 21/4882* (2013.01); *H04W 88/02* (2013.01)

(58) Field of Classification Search
CPC .................................................. G06F 17/30117
USPC ......................................................... 707/803
See application file for complete search history.

(56) References Cited

U.S. PATENT DOCUMENTS

| 6,377,530 B1 | 4/2002 | Burrows |
| 6,446,080 B1 | 9/2002 | Van Ryzin et al. |
| 6,496,284 B1 * | 12/2002 | Dow .................. H04N 1/00384 358/404 |
| 6,512,722 B2 | 1/2003 | Kumagai |
| 6,529,584 B1 | 3/2003 | Ravago et al. |
| 6,529,824 B1 | 3/2003 | Obradovich et al. |

(Continued)

OTHER PUBLICATIONS

Transcend Digital Music Player User's Manual, MP 330, Jul. 24, 1998.

(Continued)

*Primary Examiner* — Melvin H Pollack

(74) *Attorney, Agent, or Firm* — Klein, O'Neill & Singh, LLP

(57) ABSTRACT

A system that allows consumers to manage content and create audio/video presentations in a small portable media device, and to share media files with other users of small portable media devices, without requiring access to a computer.

20 Claims, 16 Drawing Sheets

(56) References Cited

U.S. PATENT DOCUMENTS

| | | |
|---|---|---|
| 6,606,281 B2 | 8/2003 | Cowgill et al. |
| 6,728,753 B1 | 4/2004 | Parasnis et al. |
| 6,735,628 B2 | 5/2004 | Eyal |
| 6,738,075 B1 | 5/2004 | Torres et al. |
| 6,779,042 B1 | 8/2004 | Kloba et al. |
| 6,779,116 B2 | 8/2004 | Tagawa et al. |
| 6,799,226 B1 | 9/2004 | Robbin et al. |
| 6,834,308 B1 | 12/2004 | Ikezoye et al. |
| 6,934,812 B1 | 8/2005 | Robbin et al. |
| 6,978,310 B1 | 12/2005 | Rodriguez et al. |
| 6,987,221 B2 | 1/2006 | Platt |
| 6,990,208 B1 | 1/2006 | Lau et al. |
| 7,020,668 B2 | 3/2006 | Matsuda et al. |
| 7,020,704 B1 | 3/2006 | Lipscomb et al. |
| 7,031,477 B1 | 4/2006 | Mella et al. |
| 7,043,699 B2 | 5/2006 | Obradovich |
| 7,103,643 B1 | 9/2006 | Jacobs et al. |
| 7,106,541 B2 | 9/2006 | Bruner et al. |
| 7,110,790 B2 | 9/2006 | Nielsen et al. |
| 7,191,190 B2 | 3/2007 | Debique et al. |
| 7,200,357 B2 | 4/2007 | Janik et al. |
| 7,243,307 B2 * | 7/2007 | Gao ............ G11B 27/34 715/744 |
| 7,277,955 B2 | 10/2007 | Elliott |
| 7,302,644 B2 | 11/2007 | Holtz et al. |
| 7,346,650 B2 | 3/2008 | Nomura et al. |
| 7,376,710 B1 | 5/2008 | Cromwell et al. |
| 7,403,769 B2 | 7/2008 | Kopra et al. |
| 7,512,622 B2 | 3/2009 | Volk et al. |
| 7,519,911 B2 | 4/2009 | Friedman |
| 7,620,363 B2 | 11/2009 | Spurgat et al. |
| 7,624,351 B2 | 11/2009 | Unger et al. |
| 7,640,320 B2 | 12/2009 | Madison et al. |
| 7,668,842 B2 | 2/2010 | LaChapelle et al. |
| 7,698,654 B2 | 4/2010 | Fong et al. |
| 7,765,326 B2 | 7/2010 | Robbin et al. |
| 7,797,446 B2 | 9/2010 | Heller et al. |
| 7,814,025 B2 | 10/2010 | Roever et al. |
| 7,827,259 B2 | 11/2010 | Heller et al. |
| 7,890,661 B2 | 2/2011 | Spurgat et al. |
| 7,920,824 B2 | 4/2011 | Janik et al. |
| 7,941,739 B1 | 5/2011 | Mohammed et al. |
| 8,132,108 B2 | 3/2012 | Gao et al. |
| 8,290,603 B1 | 10/2012 | Lambourne |
| 8,495,246 B2 | 7/2013 | Heller et al. |
| 2001/0042107 A1 | 11/2001 | Palm |
| 2002/0045961 A1 | 4/2002 | Gibbs et al. |
| 2002/0048224 A1 | 4/2002 | Dygert et al. |
| 2002/0063783 A1 | 5/2002 | Kurase |
| 2002/0174243 A1 | 11/2002 | Spurgat et al. |
| 2003/0023427 A1 | 1/2003 | Cassin et al. |
| 2003/0025834 A1 | 2/2003 | Atkin et al. |
| 2003/0037157 A1 | 2/2003 | Pestoni et al. |
| 2003/0105831 A1 | 6/2003 | O'Kane |
| 2003/0135513 A1 | 7/2003 | Quinn et al. |
| 2003/0144918 A1 | 7/2003 | Novelli et al. |
| 2003/0167318 A1 | 9/2003 | Robbin et al. |
| 2003/0208543 A1 | 11/2003 | Enete et al. |
| 2003/0225834 A1 * | 12/2003 | Lee ............ G06Q 10/107 709/204 |
| 2004/0054750 A1 | 3/2004 | de Jong et al. |
| 2004/0059792 A1 | 3/2004 | Tapola |
| 2004/0068536 A1 | 4/2004 | Demers et al. |
| 2004/0086120 A1 | 5/2004 | Akins et al. |
| 2004/0093155 A1 | 5/2004 | Simonds et al. |
| 2004/0117442 A1 | 6/2004 | Thielen |
| 2004/0128361 A1 | 7/2004 | Gaffney |
| 2004/0128366 A1 | 7/2004 | Morillon et al. |
| 2004/0133640 A1 | 7/2004 | Yeager et al. |
| 2004/0133694 A1 | 7/2004 | Karaoguz et al. |
| 2004/0148362 A1 | 7/2004 | Friedman |
| 2004/0148419 A1 | 7/2004 | Chen et al. |
| 2005/0044574 A1 | 2/2005 | Lau et al. |
| 2005/0045373 A1 | 3/2005 | Born |
| 2005/0091107 A1 | 4/2005 | Blum |
| 2005/0149213 A1 | 7/2005 | Guzak et al. |
| 2006/0168340 A1 * | 7/2006 | Heller ............ G11B 27/002 709/242 |
| 2008/0086379 A1 | 4/2008 | Dion et al. |
| 2008/0156178 A1 | 7/2008 | Georges et al. |
| 2008/0250343 A1 | 10/2008 | Berstis et al. |

OTHER PUBLICATIONS iPod Click Wheel User's Guide, Jun. 30, 2004.
iPod Mini Tutorial, Apr. 29, 2004.
International Search Report for International Patent Application No. PCT/US05/32563, filed Sep. 12, 2005, International Search Report completed Mar. 31, 2008 and mailed Apr. 14, 2008 (3 pgs.)
Written Opinion of the International Search Report for International Patent Application No. PCT/US05/32563, filed Sep. 12, 2005, completed Mar. 31, 2008 and mailed Apr. 14, 2008 (4 pgs.).
McCandless, M. "The MP3 Revolution," IEEE Intelligent Systems and their Applications, vol. 14, Issue 3, May/Jun. 1999, pp. 8-9.
Hung, C.Y. et al. "Anatomy of a Portable Digital Mediaprocessor," IEEE Micro, vol. 24, Issue 2, Mar.-Apr. 2004, pp. 32-39.
Dream'eo Personal Video Player Manual, Model E320, 2004, pp. 1-42.

* cited by examiner

SYSTEM AND METHOD FOR AUDIO AND VIDEO PORTABLE PUBLISHING SYSTEM

CROSS-REFERENCE TO RELATED APPLICATION(S)

The application is a continuation of U.S. patent application Ser. No. 11/225,245, filed Sep. 12, 2005, which claims the benefit of U.S. Provisional Application Ser. No. 60/608,631, filed Sep. 10, 2004, the contents of which are hereby incorporated by reference in their entirety.

BACKGROUND

Portable electronic media devices, such as small portable digital music and video players, have become increasingly popular with consumers. Music jukeboxes, such as the Apple iPod®, allow consumers to store music files onto portable devices and to listen to those files almost anywhere. Portable video players, such as the iPhoto® and iMovie® products, allow storage and replay of photographic or video images.

Often with such devices, the user must link generally to a computer system in order to make significant changes and/or deletions to the portable media device storage. For example, if a user wants to delete audio and/or video files from the portable media device, they generally must first connect the device to a computer system (PC), then use specific applications on the PC that navigate the menus to eliminate, delete and/or change the audio/video files. Users operating the portable device must remember unwanted songs, pictures or data and then remember to perform the PC process in order to effect minor deletions, an operation contrary to the "portability" feature of the portable media device.

Similarly, devices may not allow the user to easily manipulate audio and video files to create new and creative combinations. Music videos, for example, are very popular with consumers and the ability to create such music videos "on-the-spot" when creatively inspired would be highly advantageous. Likewise, businessmen who frequently find themselves traveling or in meetings would benefit from the ability to create audio/visual presentations while away from their computers. Travelers would benefit from the ability to combine vocal commentary with stored map images, to create personalized itineraries that can be easily carried with them.

Often portable media devices cannot share files easily, as, for example, when a user wishes to share a music or video file with another portable media device. Typically, users must operate a PC and separately connect each portable device to move files from one device to the PC to the second device.

Users who create their own audio/video presentations would benefit from the ability to easily transfer the files to other users of portable devices, without requiring a computer intermediary. For example, a businessman who creates a business presentation may wish to send the presentation to colleagues in a meeting, all of whom could then review and/or edit the presentation on-the-spot. Similarly, users of portable media devices may wish to coordinate playback of audio and/or video content, as, for example, when traveling together. The ability to timeshare media content with other uses would allow contemporaneous review of the media by all recipients.

SUMMARY OF THE INVENTION

In various embodiments, the present invention is directed to portable media devices or players in which users can manage media files, such as audio and video files, and/or create multimedia presentations, as well as share media files with other users, without needing to connect the portable device to an external computer.

One embodiment of the invention is directed to a method for managing play lists by allowing spontaneous deletion of unwanted files, without needing a computer connection. By pressing a button on the inventive device, users "zap" out (delete) unwanted songs or other media files. Thus, unwanted music and video files can be immediately removed from the user's device by a press of a button, accompanied, in some embodiments, by an alert sound and/or vibration.

Another embodiment of the invention provides a means for users to easily create multimedia presentations. One embodiment of the invention provides a portable music player that shares predetermined audio and/or video files as specified by the users of the technology to create on the spot personal music videos designed specifically for hand-held devices.

In some embodiments, a user of the invention sends and receives electronic audio and video files from the user's device using the Internet and wireless connections, eliminating the PC connection in some embodiments, and reaching other users operating around the world to share music and videos. The RF transceiver aspect of the invention saves the user time and allows creative people to on-the-spot share data files, business communication files, including music videos, whether complete or partial. Some embodiments include an alert system, user preference system and financial transaction system.

One embodiment of the invention provides sharing of digital music files, combining them with other files and then retransmitting these updated files to multiple users of the device and software systems.

In one embodiment suitable for automotive usage, the inventive device plays or uses RF transceivers to connect to the vehicles radio system, local area broadcast to caravans of vehicles listening to the local broadcast, and downloads maps for user navigation.

In some embodiments the RF transceiver is an 802.11 compliant device, and in some embodiments the transceiver uses cell phones, local area broadcasts, WLAN, infrared, laser, or optical technologies. One embodiment of the invention provides methods and devices to create and play digital music and digital videos. One embodiment of the invention provides a means to play maps on the portable device with audio files. Music and other digital audio files can operate while the user listens to recorded audio files. Bulky maps not needed by the user could be zapped off the portable device by pressing the inventive button, thus eliminating the map information from the device storage.

One embodiment of the invention provides digital files over wireless means to other receivers using wireless techniques to receive and play these files while traveling in close proximity. Users can send music, maps, photographs, jpeg video/map or WAV sound files, or any stored digital files for playback from other users or peers.

A partial list of the portable device's hardware includes: Portable MP3 and jpeg player, processor, hard drive, RF transceiver, headphones, jacks, scrollable menu list, navigation map player, audio/video interface jacks, in-vehicle car kit, Bluetooth kit, cell phone kit, antenna port, attachment brackets, multimedia display, battery, charger kit.

A partial listing of the device's software includes: MP3 and jpeg player, local broadcaster, music and video library, playing mode (wireless transceiver), voice recorder and audio storage, jpeg map player for user navigation, system settings and device information.

DETAILED DESCRIPTION OF THE INVENTION

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

Figure 1:
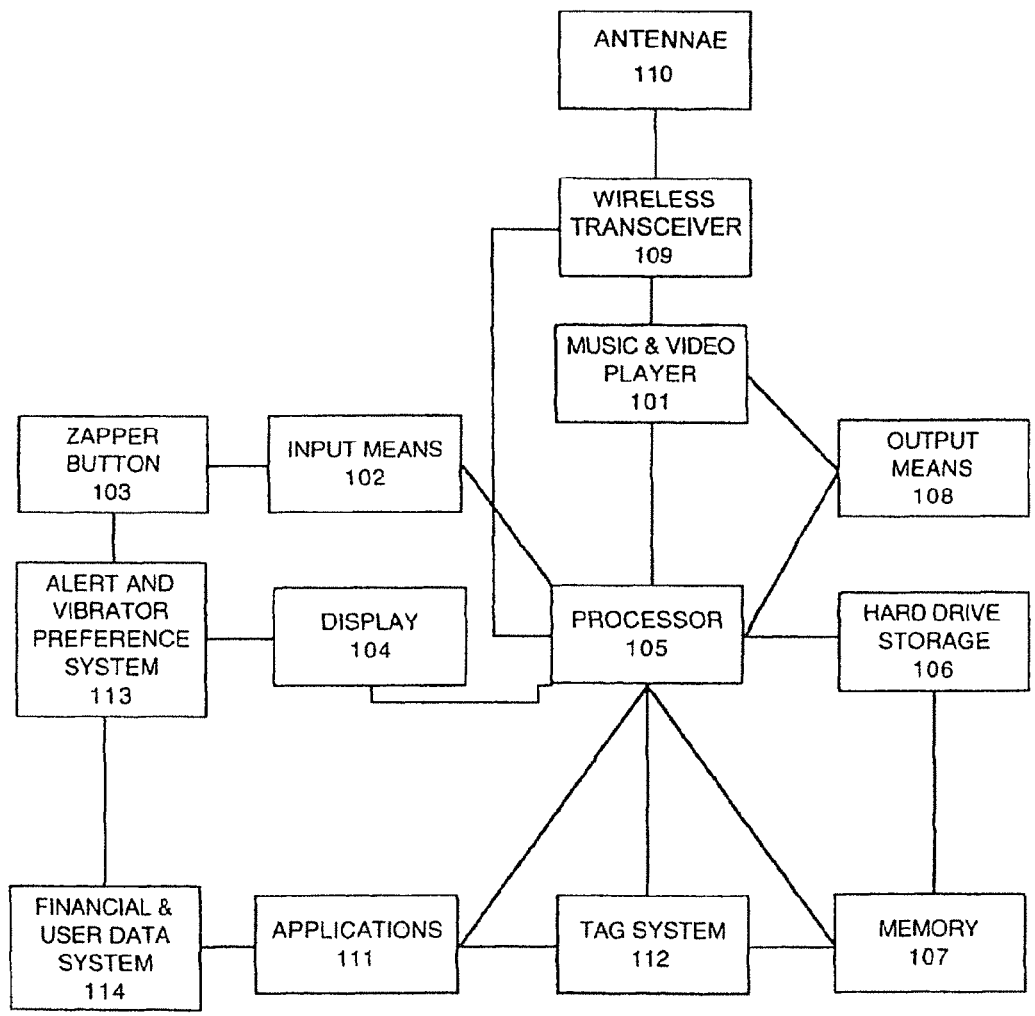
FIG. 1 is a block diagram illustrating one embodiment of a portable digital player and wireless device.

Referring to FIG. 1, there is shown a block diagram of one embodiment of a music and video player device in accordance with aspects of the instant invention. The device comprises a processor 105, music and video player 101, input means 102, zapper button 103, multimedia display 104, memory system 107, hard drive storage 106, output means 108, and wireless transceiver 109 generally associated with an antennae 110.

The hard drive 106 provides storage for applications, including associated data files, and systems to operate the device.

Output means 108 provides ear-phone output jacks and wired outputs, and may include output driving circuitry as generally known to those of skill in the art, particularly for providing audio output signals or driving audio output devices.

The wireless transceiver 109 provides wireless transmission and reception capabilities. Wireless transceivers include, but are not limited to, cell phone transceivers, Bluetooth capabilities, LAN connections, WLAN, radio frequency (RF), laser, optical, infrared and other wireless communication means known to one of skill in the art.

Input means 102 comprises, for example, keyboard, mouse, rotating wheel, toggle switches, gamepads, joystick devices and touch screen input devices, as well as other devices known in the art. Although illustrated separately, the zapper may be present on at least one of those devices.

As illustrated in FIG. 1, the antennae propagate and receive communication signals, for example radio frequency communication signals. The wireless transceiver processes the signals and provides information therein to the processor. The processor generally controls operation of various aspects of the device, generally using instructions stored in the memory or the hard drive storage. Also stored in the hard drive storage (or memory depending on device configuration) are data files such as audio files and video files. Under general command of the processor, audio output based on the audio files is provided through the output means and video output based on the video files is provided through the display. In addition, the processor executes various software applications (indicated as applications 111). Certain of the software applications, such as alert and vibrator preference system 113, financial and user data system 114, and tag system 112 are also indicated separately, although in some embodiments some of such systems are provided using hardware implementations, in whole or in part. For example, in some embodiments the alert and vibrator system includes a vibration device, implemented in hardware, which may be used as directed by the processor in accordance with preferences provided by a user and determined in accordance with software implementing program instructions on the processor.

In one embodiment, the music and video player comprises a separate chipset configured for generating audio and video signals, particularly from compressed digital audio and video. As illustrated in FIG. 1, the player provides signals, such as audio signals, directly to the output means, while video information is provided to the processor for routing to the display. In some embodiments, the music and video player is software executing on the processor using known decompression techniques and playback software to generate information for audio output, for example output by the output means, and to generate information for video output, for example by a video system provided by the multimedia display and associated circuitry and processor provided instructions, depending on configuration of the device. In operation, the processor, using the tag system, tags music and video data files, which are selected to a time line and then combined for temporal playback scenarios using, for example, direct or play list functions. The play list provides an order to pull content from audio and video libraries stored on the device, and preferably to do so to reflect tagging of the content to the time line.

Users of the device can delete data files, audio and video files immediately by pressing the zapper button 103, which, in some embodiments, provides an audible and/or vibrator alert (block 113) as specified by the user and determined by the preference system. In a preferred embodiment, the user selects a song, for example, that the user desires to delete, using the input means 102, and instructs the processor to zap out (delete) the file out of the device, and the device preferably provides the user with a robust feel and sound of a zap or buzz or any similar sound creating a "zap" effect.

Financial and user data system 114 allows the user to set (input and store) personal and business information for contact, exchange, email, cell phone number(s), ring tones similar to those found in cell phones, temporal and content options, including unique vibrator options. Financial details for wireless credit card transactions may also be entered and adjusted using financial and user data system 114.

Figure 2:
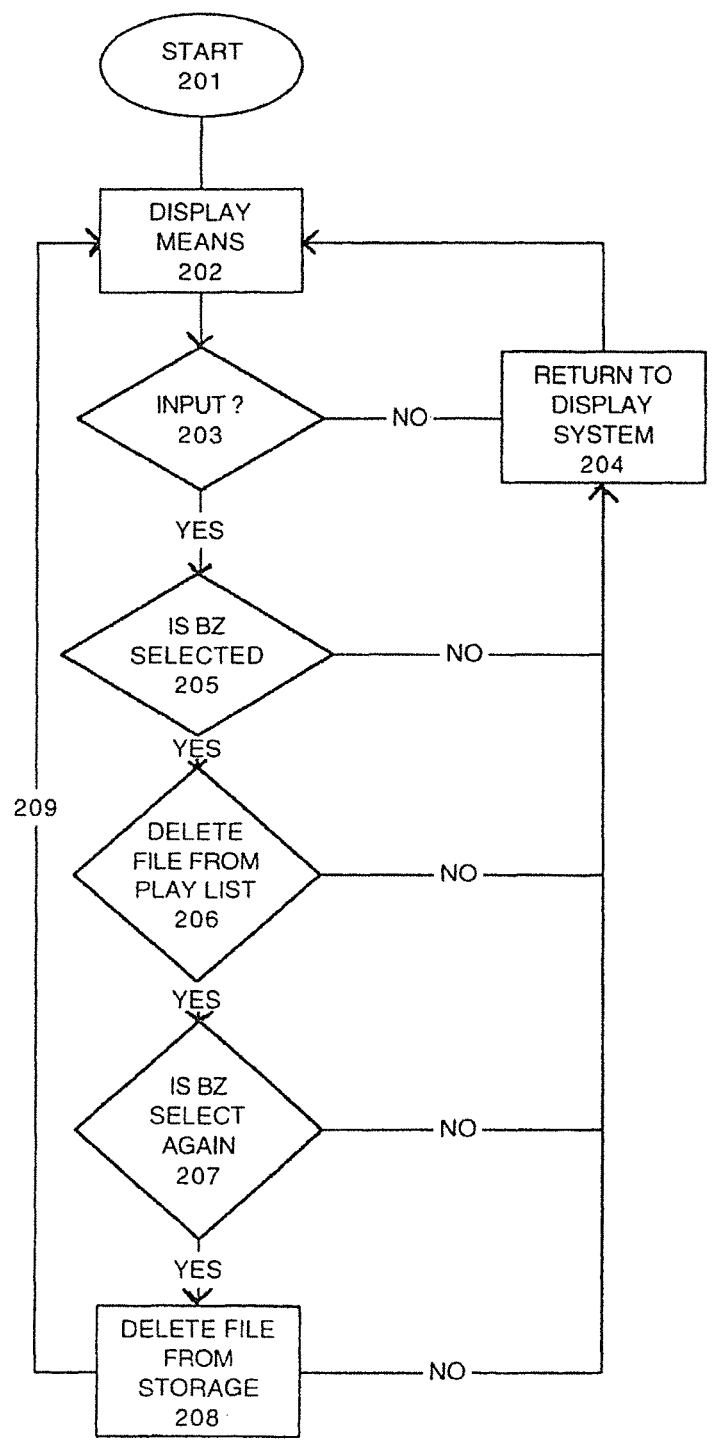
FIG. 2 is a flow chart illustrating one embodiment of the operation of the zapper button system.

FIG. 2 is a flow diagram of a process of deleting audio, video, or audiovisual content. In many embodiments the content is content currently playing on the device. Referring to FIG. 2, starting at block 201, the display shows the selection of music being played on the device 101 in block 202. In block 203 the process determines if an input is received. If no input is received the process returns in block 204 to the display system and the display shows the selection of music being played on the device in block 202. If an input is received the process determines if the input represents selection of the BZ button in block 205. Selection of the BZ button indicates a "zap" request. As illustrated in FIG. 2, if the input represents selection of the BZ button, the music being played on the device is deleted from the playlist.

In some embodiments, upon selection of BZ button 205, a user is prompted to answer the question: delete the present music (video) from play list? A "no" response returns user to block 204 and the device returns to the previously viewed screen. If the response is "yes", the selection is deleted from the play list and block 113 of FIG. 1 alerts the user that the specified file has been selected for deletion from storage. Preferably, vibration by 113 occurs simultaneously upon selection of the BZ button but the actual file is not yet deleted from the user's hard disk storage 106. In block 207 the process determines if a further input representing further selection of the BZ button is received. If so, as illustrated in FIG. 2, the file is deleted. In some embodiments, upon a second selection of BZ button 207, the user is prompted to delete the file at block 208, eliminating the file from storage on the device and sounding an alert, highlighting the selection and vibrating the device upon completion of these events and then returning to the point of beginning block 202. Thus, in one embodiment of the invention, the user first specifies a file for deletion, accompanied by a visual, auditory or vibratory cue, and then confirms deletion, causing the file to be deleted from storage.

The BZ button, or zapper button, zaps any music or video file from the storage 106 on the device. This eliminates the need for users to go back to a connected PC for eventual deletion. The display thereafter returns to the active display block 202.

Deletions done by using this method eliminate the need for time consuming processes requiring users to operate dedicated PC's for deleting selections from the music video system. Peer to Peer communication techniques can be enhanced with a one button push deletion system, which can simply zap music provided out of the device.

By way of example, consider the case where a friend has imported a music file, for example, Barry Manilow's "I Write The Songs," onto a user's portable media device using peer to peer communication techniques. The User, depending on the User's tastes in music, may wish to immediately delete the song from his portable device. Using some other device, a user may be obliged to wait until the portable media device is connected to, for example, a personal computer, with the user hopeful that the user will remember to delete the offending song at that later date. In accordance with aspects of the present invention, however, the user can delete the song immediately by calling up the display and listing the music files in the play list, selecting "I Write The Songs" and pressing the BZ button to delete the song from the play list. A second push of the BZ button deletes the song from storage. Depending on how the user has set up his preferences, each push of the BZ button may prompt an alarm, for example, a buzzing or zapping sound and/or a vibration, to alert the user that he is about to delete a file.

Figure 3:
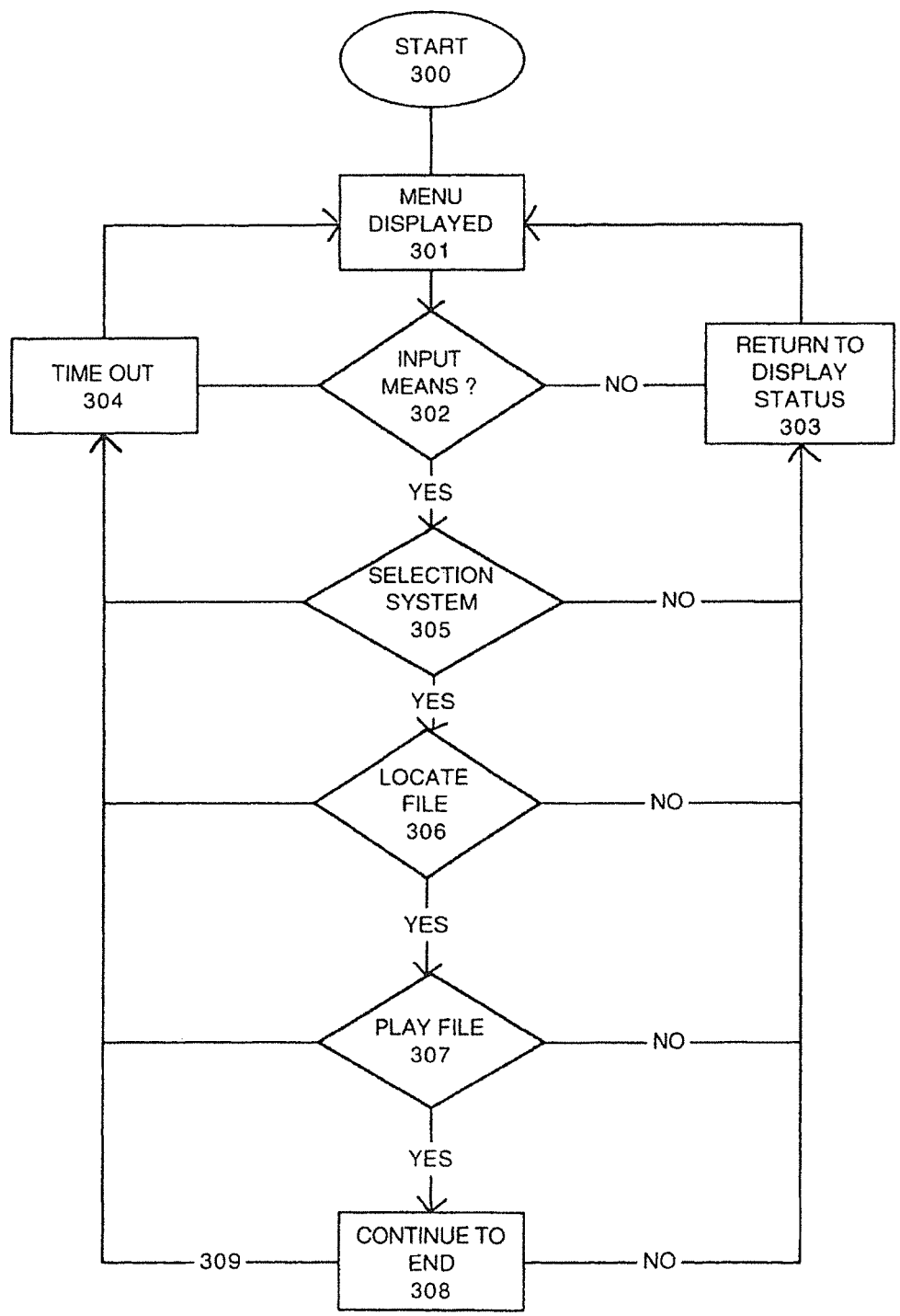
FIG. 3 is a flow chart illustrating one embodiment of the menu and operating system of the device.

FIG. 3 illustrates one embodiment of the invention providing an operation system starting at block 300. The menu is displayed upon start-up of the device 301. The user may use the keyboard or other input device 302 to select from the system at block 305. If the user does not use the input device, the system returns to display status 303. After selecting from the system at block 305, the user locates the music digital files 306 for playing at block 307. Block 307 may be music, map, still or moving video data files that have been activated using the menu system to coordinate temporal and video requirements. The files play at block 307 until the end at block 308. Block 308 is encountered when all of the temporal requirements have been met. At any time, the user may abandon each block 302 to 308 by non action after a predefined time period block 304, returning the system to the device display block 301. If at any time after block 301 (during 302 to 308), the user selects "no", the system returns to block 303 and the device display block 301.

Figure 4:
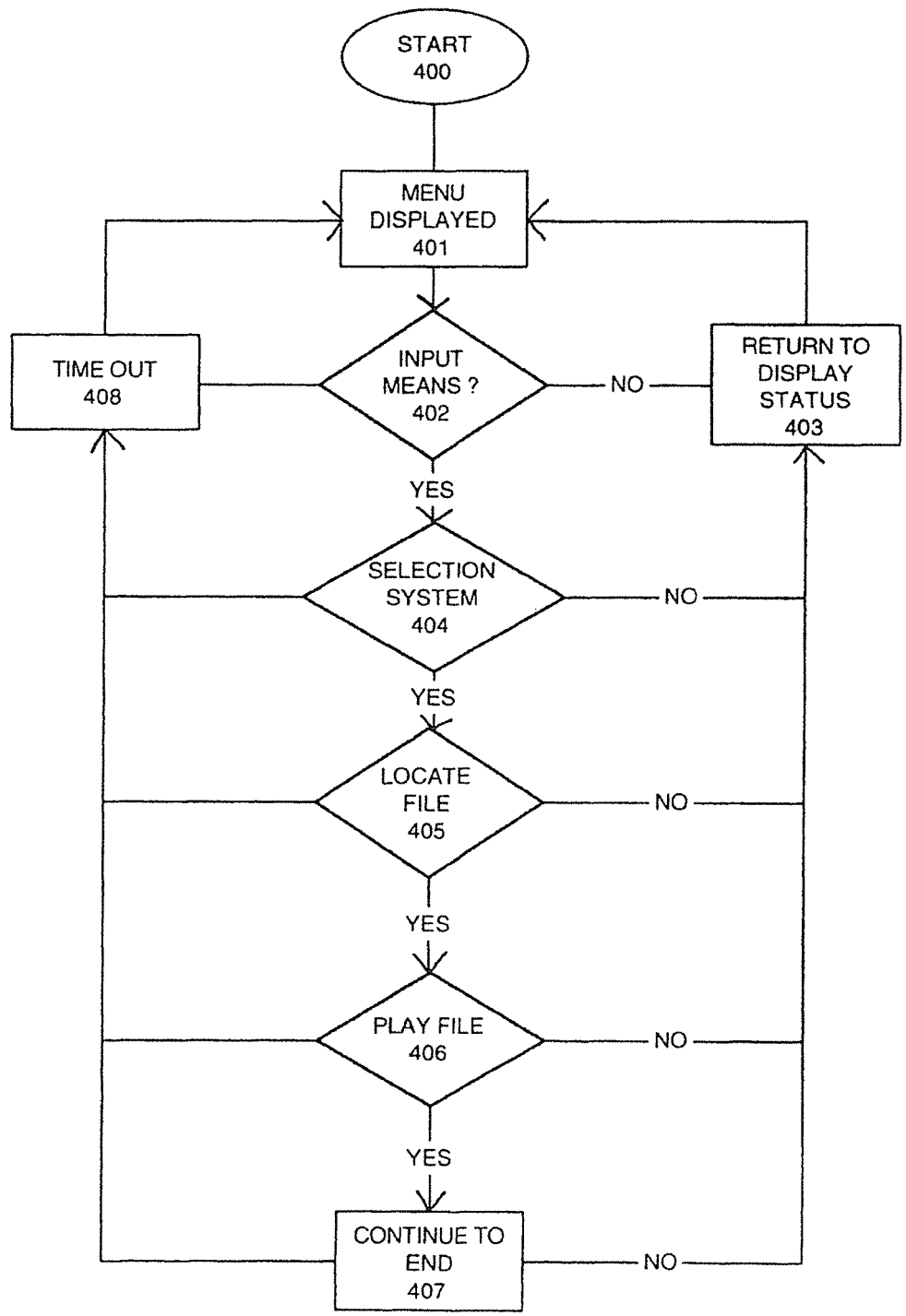
FIG. 4 is a flow chart illustrating one embodiment of the operation of the device.

FIG. 4 is a flow chart illustrating a typical menu system of the music and video player of the instant invention, starting at block 400 where the menu is displayed on block 401. If an input is detected at block 402, a selection system 404 is presented; otherwise, the device returns via block 403 to the menu 401. The selection system 404 optionally comprises a hierarchical categorization of files through which the user can navigate to identify the desired file.

At block 404, the user selects the file to play. Block 405 is the file locator system; in one embodiment, access is made to the storage 106 using memory 107 and processor 105. Upon display of the desired file, user selects the located file 405 and plays the file at block 406. When all of the play lists and/or files have been played, the device ends play at block 407. If, at any time during blocks 402 to 407, the user abandons the request, the system times out at block 408 and returns to the menu display at block 401. If at any time after block 401 (during 402 to 407), the user selects "no", the system returns to block 403 and the menu display block 401.

Figure 5:
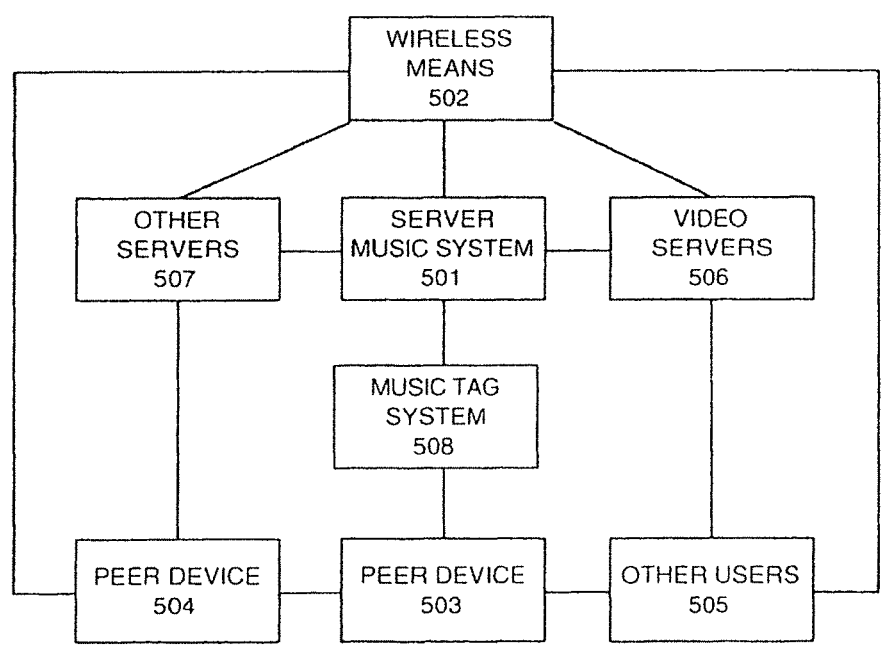
FIG. 5 is a block diagram of one embodiment of the portable device, server and wireless system.

FIG. 5 is a block diagram of one embodiment of the invention, providing the device, server, wireless and tagging system capabilities. Users (peers) at block 503 communicate with a peer device, block 504, and other users, block 505, using the system's wireless means block 502. When a user inputs a request, a server music system, block 501, accesses a video server(s), block 506, in the device, and optionally connects to outside server(s), block 507, to access content by wired or wireless means. The system provides a means to connect music and video files together using an application system, music tag system block 508. Upon proper encoding of each audio and video file, a portable music system for playing and seeing tagged music videos block 508 is provided.

For example, take the case of a user who wishes to create a music video in which the finale of Tchaikovsky's 1812 Overture is played while a video of his pet dog chasing a butterfly is artfully displayed. The user selects the 1812 Overture music file from his play list, if it is stored on his portable media device, or he imports the music file via a wireless means from a peer device or other users, or via a connection from other servers. The user then selects the video of his pet dog, either from storage on his portable media device, or via a wireless means from a peer device or other users, or via a connection from other servers. The two files, the 1812 Overture music file and the pet dog video file, are then tagged to associate the two files, and the tagged files encoded for playback on the portable media device.

Figure 6:
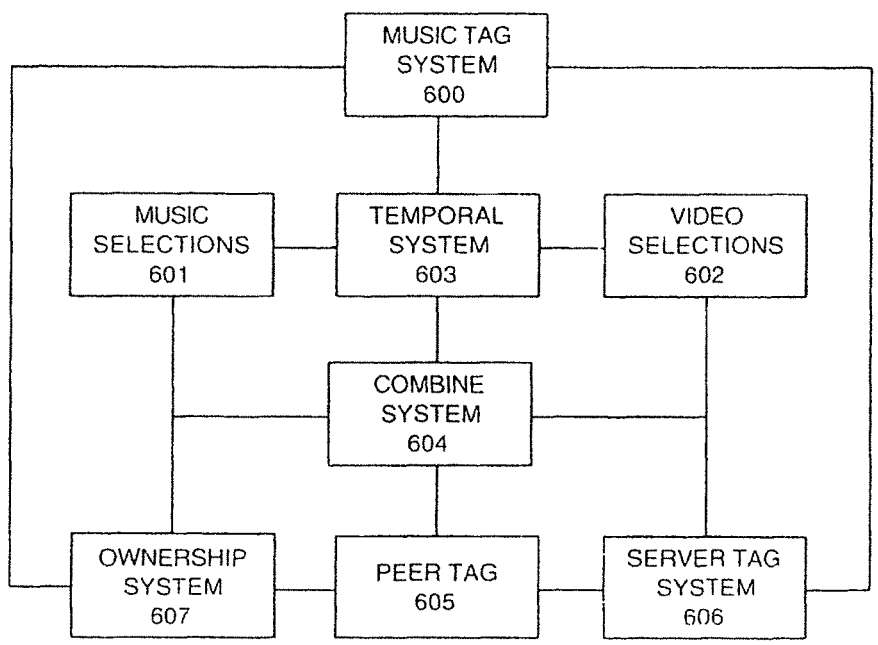
FIG. 6 is a schematic diagram of one embodiment of the music video tagging system of the invention.

FIG. 6 is a block diagram of one embodiment of the music video tagging system of the invention. Block 600 tags each data file in the system to a master published system, similar to the HDDP Internet site used by Apple computer when music downloads obtain music titles and subsequent digital compression to various techniques including MP 3 music files. The invention codes video files in a similar way, except users create unique lists of videos. The tagging system 600 provides a log of ownerships and permissions maintained by publishers of content. Individual publishers and creators may use similar techniques by using the tag system 600.

Block 603 allows users to select a time line for playing music and audio files. By dragging video files, block 602, and music selections, block 601, onto the temporal control system, block 603, music and video are united for play. The file, which may a separate file including timing information for content, is tagged with information about timing, play formats, encoding techniques and, in some embodiments, usage by peers using the device or system, block 605, or using the server tag system, block 606.

When each temporal combined file is united, the system checks for copyright and trademark protection in block 607. Upon proper notification, the user may publish the tagged file for broadcast or play from the storage 106 on the device or server.

In one aspect of the invention, block 607 scans files upon activation for ownership review and classification. Audio and video selections are tagged by block 600 and the tag is sent by communication means to an Internet site for evaluation and encoding of ownership rights. The Internet site 901, 902 and/or 903 reviews the tagged file and further processes the file for additional encoding by property owners, and right to use requirements are established; additional tags are then attached to the audio and or video data file. Upon completion of the encoding and evaluation process, the file and its header is returned to the original requestor and the updated information is tagged to the original data file. A file record is retained at the server Internet site 901, 902 and/or 903 for subsequent evaluation. Subsequent usage retains the ownership properties of the file.

Another aspect of the invention provides new publishers means to encode files and provides publisher requirements established by individual and corporate schemes for determining ownership rights and usage requirements on the server Internet site. The Internet server site 901, 902 and/or 903 monitor and control tagging for usage of the media files when communicating by using the network. Communication requirements of the users operating using the network are subject to review by the ownership system at the server, not shown, similar to the device block 607 at 901, 902 and 903.

Ownership tagged information may include the following audio and video data files: publisher and contact information, usage permissions, modification rights and limitations, temporal usage limitations, advertiser rights and limitations and usage, financial arrangements and purchase rights and limitations, artist name and contributors, song name, time codes, artistic modification limitations, album, genre, genus, date acquired, advertiser information, size, year published, compression rate, sample rate, file type, track information, comments, fade in and out, equalizer preferences, ratings by users and others, last played and or updated status and other file designations.

Music selections 601 and video selections 602 are combined in block 604. When block 604 completes by either the users 605, servers 606 or protection system 607, the file is given an identity header encoded with all the combining tags and returned to block 600.

Block 602 may contain still videos, animated gifts, jpegs, movie projector files or any known file type retaining its protection characteristics under block 607. User defined and unprotected music and videos may be combined without using the underlying protection system 607.

Wireless transmission can be done in one of several ways, as will be appreciated by one of skill in the art. Transceiver 109 can use one of several techniques from antennae 110 to output means 108, in the event wireless transmission uses, for example, IR communication techniques, for example in accordance with IRDA standards and with output means 108 including an infrared transmitter and/or receiver.

Figure 7:
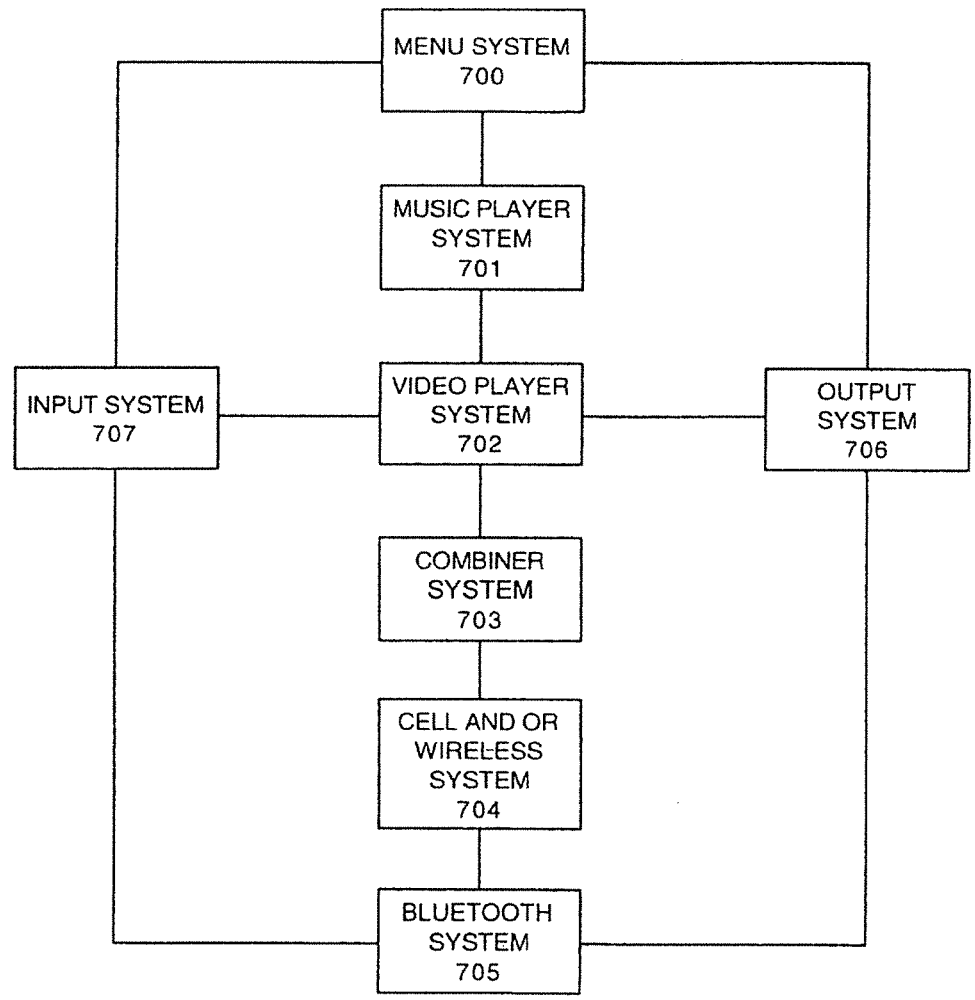
FIG. 7 is a block diagram of one embodiment of the inventive device operations.

Referring to FIG. 7, block 700 shows the menu system and operating capabilities. Block 704 provides wireless capabilities such as cellular communications, RF techniques, laser, line of sight, infrared, optical means, Bluetooth communications, shown at 705, and WLAN and 802.11 communications means, not shown. Users may send any number of files, including music and video files, block 701, and combined and tagged files, block 703, from storage 106 by using the output system 706 and exporting the tagged file using block 704 and/or block 705.

Figure 8:
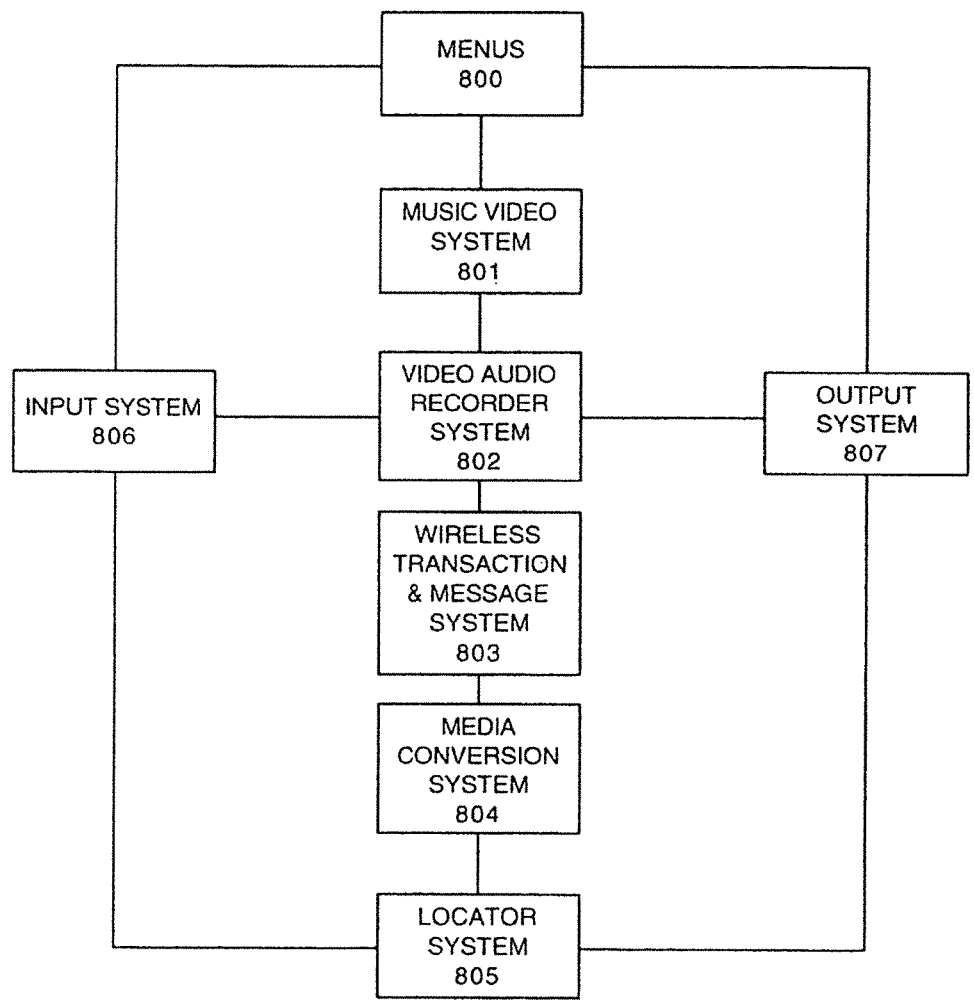
FIG. 8 is a block diagram of one embodiment of the menu system of the inventive device.

Users can store files on external servers, local PC's, or in the device storage at block 106. Any video file may be played, either by selection by the user or as directed by the combiner, e.g. tagged video files are automatically played in accordance with the user created music video without further action by the user Referring to FIG. 8, block 800 refers to the menu system comprising, in part, block 801, the music video system. Content is input via direct connection block 102 or wireless means, block 502, and stored at 106. Processor 105 causes the system to display menus, block 800. Menu options include, but are not limited to, encoded music videos, block 801, video queues for the video audio recorder system, block 802, wireless transaction queues for purchasing music, block 803, and video selections that have been obtained by blocks 806 input means. The user's credit card information, contact information, etc., are stored, block 107, for usage at block 803 after input at block 102. Upon confirmation, using blocks 502 wireless means or block 901, 902 and/or 903, user confirms the purchase transaction for content storage 106 using processor 105.

Block 804, media conversion system, allows the user to change the file, MP3, ASCII, AAW Wave files, jpeg, mpeg and any other known file type, converting the files at block 1007, output music video system. In addition, block 804 media conversion system allows the user to more accurately exchange and convert data files into preferred file formats. User may use a preferred native format in handling and usage of data by selecting stored files and processing through the filter means in block 804 for media conversion. Block 803 provides a message contact system such as provided by contact managers used in PDA device systems (not shown).

Figure 9:
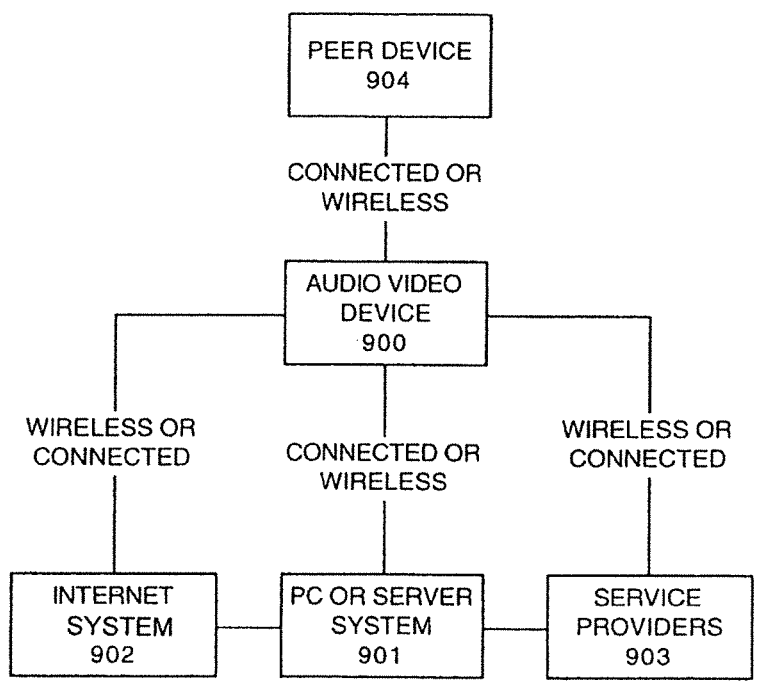
FIG. 9 is a schematic block diagram of one embodiment of the wireless features of the device.

FIG. 9 refers to another embodiment of the audio video device, block 900. The device communicates using wired or wireless means, block 502, 901, 902 or 903, to connect to the user's PC or server device or system 901. In addition, users connect to the Internet 902 using wireless means 502 or direct connection. Peer devices, block 904, communicate using connected or wireless means, block 502, with the user, block 900. Peer sharing of audio and video files with the user is allowed in block 904, provided the predetermined preference tags have not precluded interaction and exchange of files in block 803.

The modem for direct connections is not shown. Service providers of audio video content or messages connect by block 903. Map publishers, weather providers, movie clips, business videos, advertisements in audio and video formats are sent to the users device using wireless means or direct connections.

Advertisers may obtain the user's preference information by contacting the transaction system block 803. Advertisers use certain criteria to evaluate payment or non-payment arrangements to deliver content to the users device 900. Users may prohibit advertisers from obtaining certain information at block 803 preferences, not shown.

Advertisers and intellectual property owners may retain additional control at block 607 using the copyright, trademark protection system and block 803, the transaction system, by limiting usage privileges. Users may be required to send additional data or money to the advertiser, publisher, or property owner of the audio/video files at block 803. Property owner control of the encoded data file is assured at block 803 confirmation at block 607. Block 607 may be activated remotely using blocks 901, 902, and/or 903 on device 900 to detect block 1109, 1007 or block 600 music tag system to limit usage or changing of the content. Audio and video files and data provided in a predetermined free format or native content format may lose the necessary properties for control by intellectual property owners.

Figure 10:
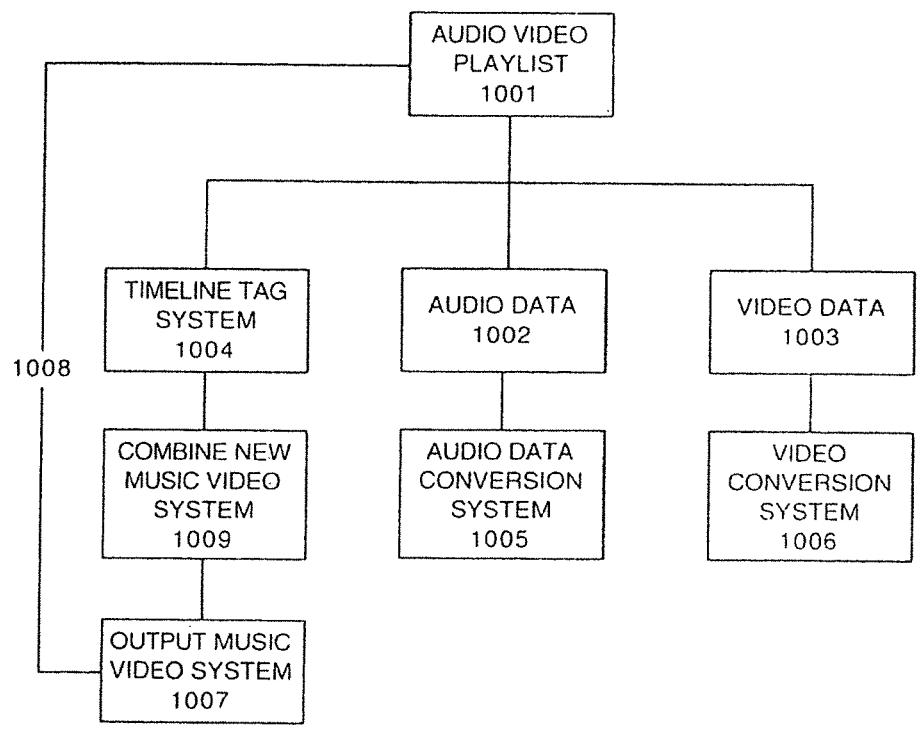
FIG. 10 is a block diagram of one embodiment of an audio video play list of the instant invention.

FIG. 10 describes a system for creating an audio video play list, block 1001. Users select audio data block 1002 and/or video data block 1003. If the data files are not compatible for usage, the user selects blocks 1005 and/or block 1006 to convert the file to native formats and continuation. Selected audio data 1002 and video data 1003 are arranged for temporal tagging at block 1004. Temporal tags are arranged for play upon activation of each tagged file at block 1009. Selections joined by the temporal system 1009 are played according the requirements that are predetermined by the temporal system having a minimum and maximum designation and usage. In some embodiments, information regarding timing information between audio and video is maintained in a separate file, and in some embodiments the audio information is provided data indicating associated video and temporal relationship to the audio. Once the combined music video is assembled at block 1009, the user selects output system 1007 and the format type for playing is allowed. Completed music videos are then assembled in play lists block 1001. Individual play is allowed at block 306 and 307. Jukebox type play is arranged at block 1001.

Figure 11:
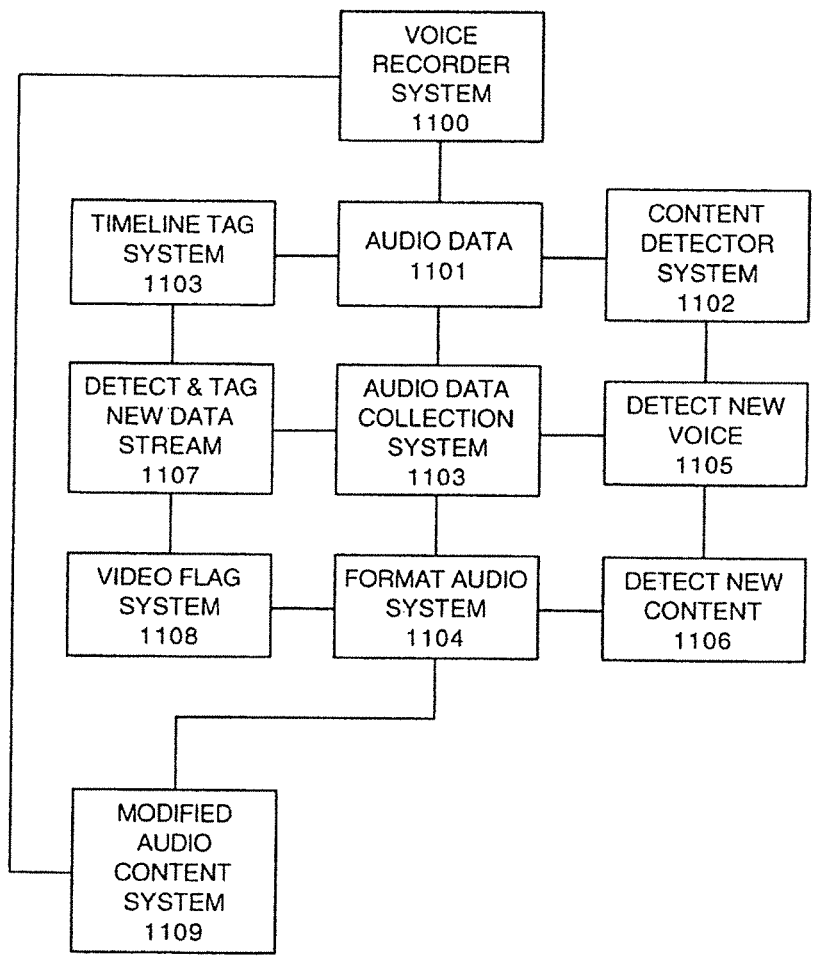
FIG. 11 is a block diagram of one embodiment of a voice recorder system.

FIG. 11 describes the voice recorder system block 1100. Known voice recorder functions are enabled with several additions. Video images of the voice data are presented temporal context. Time line images, icons and symbols are tagged to the audio file as reference marks as to indicate speaker changes, content changes, context changes and other predetermined content allowed by the device's input means block 102. Audio data is detected at 1101, content detected at 1102, and tagged at block 1103, with further detections at block 1105 (new voice) or block 1106 (additional content messages). Content input 1101 and 1106 collect and merge in block 1103. New data streams from 1105 or 1106 are tagged at timeline 1103 and sent to block 1107 for continuous input streams. Stream data files tagged assign flags i.e. discrete icons and symbols. Video tags, icons and symbols are thus added to the recorded audio file block 1109 for usage. Thus, in some embodiments, audio data provided by the user, for example provided by way of a microphone forming part of the input means of FIG. 1, is combined in a temporal manner with video data.

Figure 12:
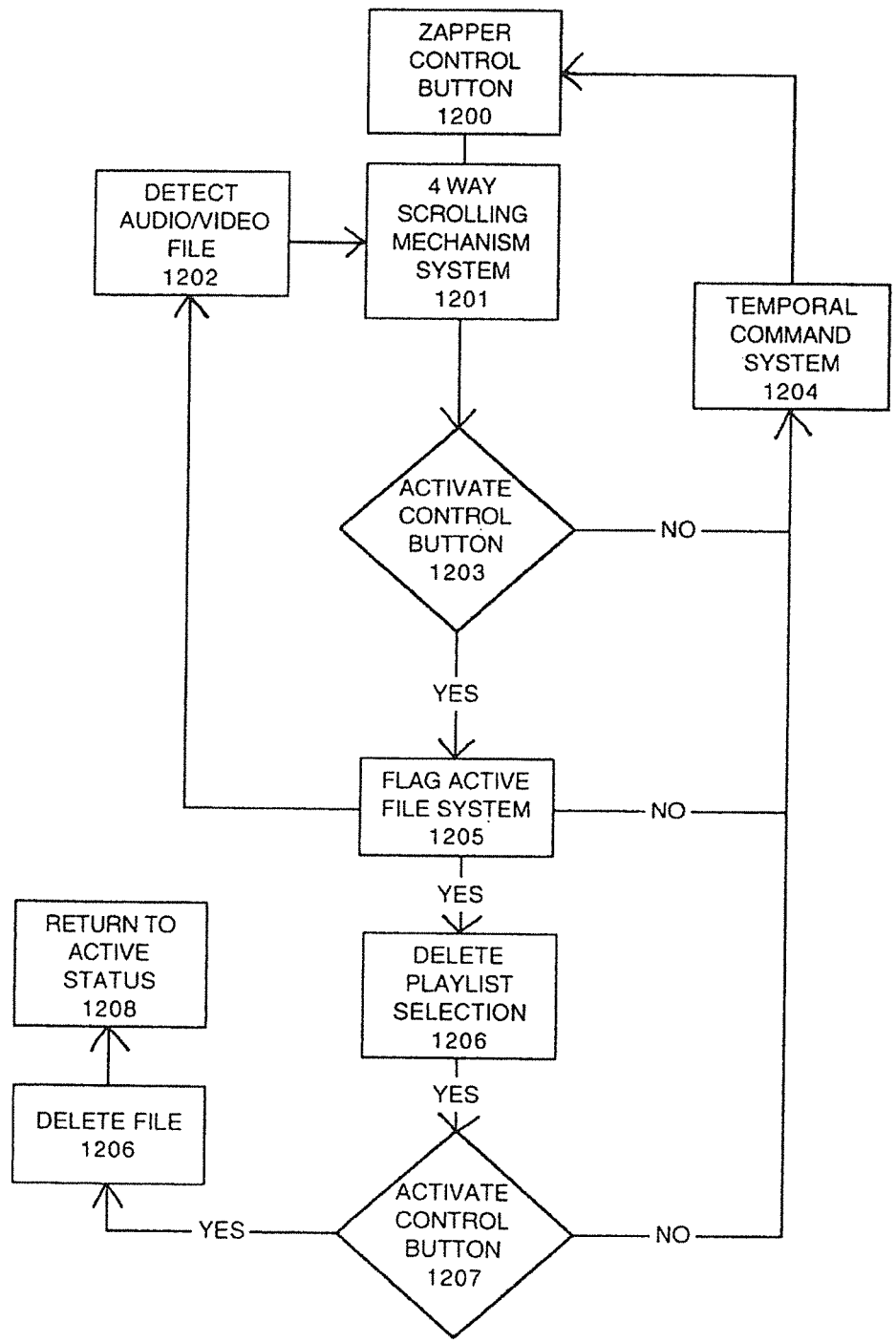
FIG. 12 is a block diagram of one embodiment of the zapper control button operation.

FIG. 12 shows an embodiment of the invention, with reference to the deletion of active audio video data files 1202. The zapper control button 1200 is selected and allows the user to select from 4-ways plus pushing in order to delete files being activated. Pressing button 1200 shows the user the selection indicated and the options menu to delete the selection from the play list; if the user does nothing, the selection times out. Activating the control button again, block 1203, flags the file, block 1205, for deletion from the play list at block 1206. Activating block 1207 by pressing button 1200 deletes the data file permanently at block 1206 and returns the user to block 1208 active status of the previous selected state. Block 1209 sounds an alert and/or vibrates the device upon activation of the zapper button and execution by deleting the file from the play list selected. Alert options are set in block 113 and block 114.

Figure 13:
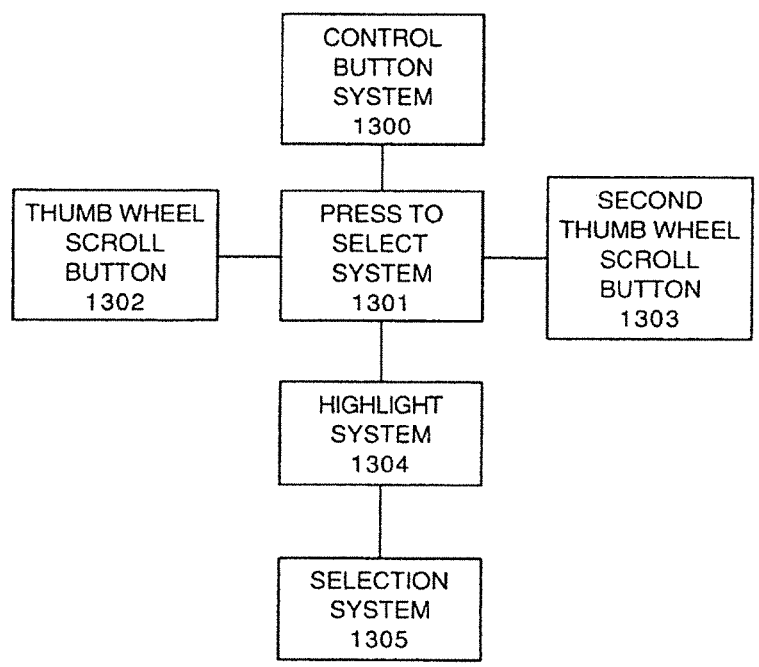
FIG. 13 is a block diagram of one embodiment of the control button system.
Figure 14:
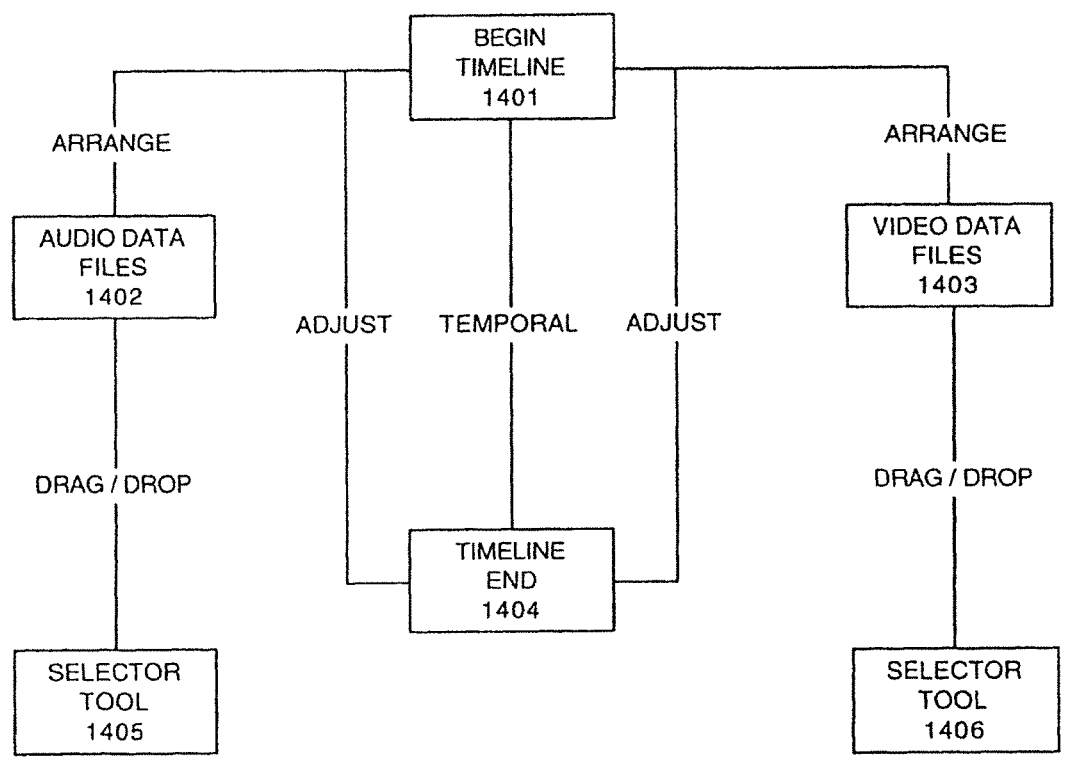
FIG. 14 is a block diagram of one embodiment of a timeline system.

FIG. 13 refers to the scroll wheel button at 1300. Pressing the button 1300 highlights the selection on the display. Play is viewed on the display screen in either color or black and white as is the known prior art practice. The user refers the displayed elements when making changes by selecting, highlighting and adopting as is the known practice in prior art references. Thumbwheel adjustment devices provide known scrolling up and down and sideways left or right by a second thumb wheel button block 1303. Highlighting audio and video files and data are activated by blocks 1300, 1301, 1302, 1303 and 1304 and terminating at block 1305. Any time the user selects the delete file option block 1206, it invokes block 1209 and an alert is announced and vibrates the device according to the predetermined options selected in block 1307. The highlighting system 1304 provides connections to the alert vibrator system at block 1306 to remind the user that an important notice is selected and the user should take notice and to select the proper intended action.

Hand-held feature of the device provides mobility experience that may mask the importance of certain tasks, the alerts and vibrations at block 1306 provides the notice message that the user can act on accordingly.

The present invention allows the user to abandon the prior art practice of connecting to a PC or server in order to modify files. Additionally, users modify the device memory and storage by using the timeline system at block 1401. Audio selections are listed on the left block 1402 and video selections at block 1403. In the middle is the timeline beginning blocks 1401 and 1404 ending of timeline. In some embodiments, indications of available audio, indications of available video, and a timeline are provided on a display. Adjustments of temporal features are selected by block 1405 for block 1402 and block 1406 for block 1403. Selected audio and video data files are dragged and dropped, onto the timeline in some embodiments, in the desired order of play, starting at the top and ending at the bottom. Adjustments as to the time played, time on scene and event triggers are arranged at block 1401 to 1404 on the timeline designators. Thus a still video can play for a predetermined time while the audio track plays out. Streaming still videos are timed as to playing time, viewing time, blanks or substitutes frames are allowed. Streaming video clips are arranged for play using the video time line at blocks 1401 and 1404. Connection of the audio and video time lines together provides the user with uninterrupted play of the audio and video movie or music video. Audio is not limited to music, as business communications, presentation media, voiceovers and the like can be arranged in this manner for play.

Thus, for example, a user can select images of graphs or other files to be used for a business presentation, record commentary for each of the images, then use the present device to combine the audio commentary with the visual images to create an on-the-spot presentation, which may be shared with peers via wireless or direct connections.

Similarly, a user can plan a travel itinerary by selecting maps showing the planned route and either recording commentary regarding planned stops, or acquiring prerecorded commentary via wireless or direct connections to servers, peers, or other sources regarding places of interest. The user can then use the inventive device to associate with commentary with the relevant portions of the map to create a personalized travel guide.

Figure 15:
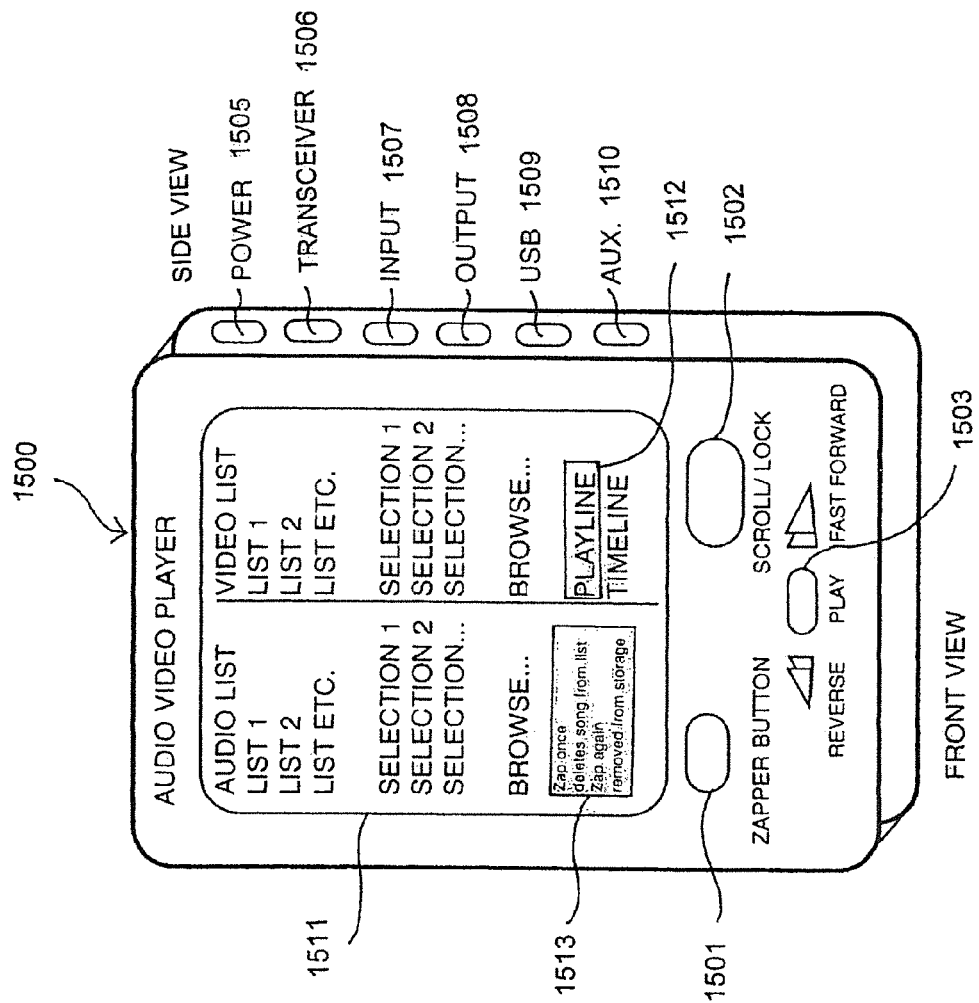
FIG. 15 is illustration of one embodiment of the device, illustrating several of its features.

FIG. 15 shows to an audio video player 1500 in accordance with one aspect of the present invention. The player includes a display 1511, which may be a black and white LCD, TFT or other known display techniques. Alternately, display 1511 may be a color screen similar to those found on cell phones and cell phones with cameras. The display 1511 shows an audio list, an audio selection list, a video list, a video selection list, browse options, a zapper message box 1513, and a playline/timeline selection option 1512.

The audio list contains the audio files stored in the storage medium (not shown) of the player 1500. Preferably, the audio files are stored in a hierarchical menu scheme as determined by the User. For example, the User may create a List 1 to include works by the Beatles, a List 2 to contain classical selections, etc. The browse option may be used to review all audio files stored in the audio list(s). Similarly, the video list contains the video files, including graphic, photographic, movie, etc., files, that are stored in the storage medium of the player. Again, these files may be stored in user-created subdirectories, where, for example, List 1 may include photographs of the User's dog, Jude, List 2 may include compressed digital video files of the Jude playing, etc.

Files are arranged on display 1511 in top down or other predetermined order, and users select files or other features by pressing scroll/lock button 1502, which may be a 6-way selectable switch, adjustable side to side, top to bottom (up and down), left or right in a rocker switch or thumbwheel scroll mechanism.

In operation, the User presses the scroll/lock button 1502 to move through the displayed lists, or to browse the stored files, selecting the desired file by highlighting it, then pressing play button 1503 to play the selected file.

If the User wishes to play more than one file in a particular order, the User shifts to timeline mode, then highlights and drags each file to a location on a timeline. The order in which the files are arranged on the timeline determines the order of play for audio or video media. Attaching the selections by highlighting the selection then selecting locations on the timeline fixes the temporal requirements as previously discussed.

Users may also combine audio and video files to create multimedia content, as described above. Users employ the scroll button 1502 to attach media to the timeline on the display, then select the time line again to provide further adjustments to, timing sequences, delivery, staging, modifying, updating, selecting etc. Timing and playing follow similar dialogue for attaching and adjusting. Video images, stills, moving video clips are attached to the time line, then temporal adjustments are made to time the video with the audio presentation. Extending and shortening time sequences for individual and multiple selections of video provides a unique experience to mix and match timing sequences of the videos with the underlying audio sequences.

Another aspect of the invention allows users to overlap audio and video sequences using the timeline tool and playing in overlapping time zones. It is common practice for disc jockeys in a club environment to overlay audio and the invention provides overlapping for both audio and video media for playback. In other words, multiple items of audio and/or video may be simultaneously played in some embodiments. Playback generally means playing of the intended play list. Individual selections of the media are played by pressing button 1503 once, pressing again to pause play. After a predetermined time original play is restored by non-action by the user. Selecting play again causes continuous play or by pressing fast forward the selection advances to a prearranged advancement point by determining the end of the present selection or advancing the play list sequence to the next noted event starting point. Reversing the selection at 1503 repeats the current selection to the point of beginning marked by either the beginning of the selection or beginning of the play list or until the button is released. Pressing reverse again advances play to the very beginning of the selection then press again for the beginning of the play list.

When playline is highlighted on the display media, selections are arranged in order of play. Short media clips may be repeated several times and played simultaneously with both audio and video media to gain special effects advantages. Selection order is arranged by highlighting the playline button, switching to the timeline sequence allows users to drag and drop selections at discrete points along the timeline. Enlarging the discrete temporal points allows for minute adjustments on the timeline for media. Certain music selections using symbols, icons and graphic images can be dropped on to the timeline or playline for usage.

Dragging the images gives the user a graphic image of the selection which could be a complex image, multiple images, composite images or moving sequence clips and footage segments. Complex usage is provided by arrangement of these symbols, icons and graphic images of the media.

Zapper button 1502 can be used in another aspect of the invention to rapidly move media to another location on the play list segments. Zap the selection and within a predetermined time by scrolling then selecting the zapper button again the user is given an option to move the document to another location within the play list, playline or timeline. Quick zapping provides rapid movement of media selections intended for a different usage.

Users planning events for audio and video presentation often need overlap of temporal sequences in both audio and video media environments. The invention allows users to pre-plan execution scenarios that maximizes playback enjoyment for all.

Creative on-the-spot temporal adjustments using the timeline application on the display and applications for arrangement of play are another aspect of the invention. Playback sequences are started for play of the prearranged lists. Users may interrupt the play sequence by inserting new selections using button 1502 scroll. Locking the device controls temporarily is done by simultaneously pressing two portions on the 6-way button 1502. Unintentional selections are avoided by pressing some other combination, for example, both 1501 Zapper button and the 1502 Scroll flock buttons.

By way of example, consider the User who wishes to create a multimedia tribute to his favorite pet dog, named, for example, Jude. User begins by browsing his audio list and selecting List 1, Beatles music, then selecting the song "Hey, Jude" which he highlights and drags onto the timeline. He then browses his video list, selecting List 1, and reviews photographs of Jude, highlighting each one he wishes to use and dragging each to the timeline in the order in which he wishes them to display. User sets the time for which each photograph will display, coordinating to ensure that the total time for displaying the selected photographs corresponds to the length of the "Hey, Jude" music tract. Next, User opens audio files, List Two (classical music) and selects the finale of Tchaikovsky's 1812 overture. He highlights and drags this file to the timeline, to play after the conclusion of "Hey, Jude." User then opens video files, List Two, and selects a video of Jude chasing a butterfly. He highlights this file and drags it onto the time, coordinating the timing such that the video will play after the photographic images of Jude, and while the 1812 finale is playing. User selects a video that will end just prior to the conclusion of the 1812 finale. In order to ensure that the video portion of his presentation concludes concurrent to his audio portion, User selects a final photographic image of Jude from List One and drags it onto the timeline, so that it will display as the bells of Moscow are ringing in victory in the audio of the 1812 Overture.

Normal play of audio and video selections starts by pressing button 1503, with additional buttons or switches allowing reversing or fast-forwarding the selection. Alternatively, a single multi-way button or switch may provide for play, pause, reverse and fast forward functions. Pressing zapper button 1501 prompts the processor to send the display message 1513 advising the user that further action will delete the selection from the play list and, upon yet another activation of the zapper button, will delete the selection from the storage on the device.

Side view shows the power attachment 1505 to recharge the onboard battery as is prior art practice. Transceiver port 1506 provides for antennae output. Input port 1507 provides connectivity for additional keyboard or other external input devices to facilitate naming, updating and changing of files. Onboard input is done by using the combination of buttons 1501, 1502, and or 1503. Output for external devices is provided at port 1508, certain multimedia devices require different communications links and are enabled at 1508. USB communications for use with PCs and connections to the system is by port 1509 for all known USB type communications. Auxiliary (AUX) port 1510 provides another communications means and system for interacting with the device for input and output. Multimedia systems for audio and video content are sent using output 1508. Optionally, a microphone may be incorporated into the device.

At start-up, the user selects button 1503 play/pause and holds for a predetermined time until the screen is activated. The device continues its start-up operations and when the user may continue with operations the devices screen will activate and the buttons become operational. Holding the play button down at 1503 for a predetermined time shuts down the device. Start-up can be initiated by one of several methods, by input 1507, power 1505, USB 1508, AUX 1510 or pressing button 1503.

Figure 16:
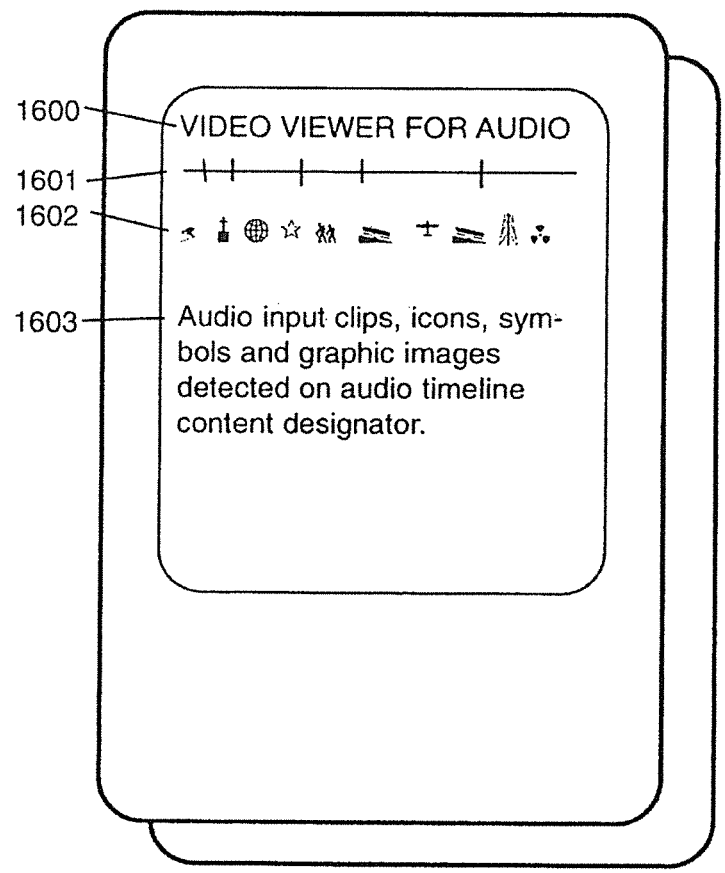
FIG. 16 is a illustration of one embodiment of the video viewer for audio usage.

FIG. 16 is a graphic image for FIG. 11 schematic diagram. FIG. 16 shows the devices display with audio content 1600 populating the device. Populated audio content has icons, symbols and graphic images at 1602. Timeline 1601 shows discrete content markers on the line 1601, separated by markers on 1601. User icons 1602 depict content on audio input. Users select from a prearranged icon, symbol list for content or personal graphic images, then assign images for mapping on the timeline sequence for easy identification of individual segments. Business communications often use thumbnail graphics and this invention provides additional usage of same. New usages are enabled by the inventions multiple image path of audio and video segments for the assisting the user in storyboarding media content.

Storyboards provide additional identification elements for construction of audio video media content. Streamlining content by image identification allows the user an opportunity to understand the flow of events when played on the device.

The video viewer aspect of the invention enables users to program objects into long sequences, chapters, books, lists, arrangements etc. for hours of viewing enjoyment. Multiple users can encode chapter environments and communicate these collections to other peers or users of the system. Dynamic content can be sent to a central user acting as a broadcaster to other listeners and users. Dynamic content sequences can easily be joined by selecting the active icon, symbol or graphic image at 1602, then selecting join or play depending on the usage. Joining the sequence allows the user to dynamically update playing sequences by selection of the designated icon and selecting the zap 1502 and play button 1503 in sequence within a predetermined time period. Selecting 1602 icons, symbols or graphic images allows the user a short-cut to playing the sequence when in the play mode.

Editing voice scripts users may select the iconic images and drag or drop them to change the arrangement, by selection of iconic images at 1602 then selecting 1601 to attach the data at the spot designated. Double selecting the timeline 1601 allows for further temporal adjustments.

The invention has been described in various embodiments, and claims the aspects as described and/or combined, and insubstantial variations thereof.

What is claimed is:

1. A method for deleting at least one unwanted media file from a playlist timeline and from a plurality of media files stored in a computer-readable medium of a portable media device, the method comprising:

displaying a timeline on a display screen, the timeline depicting a first stored media file and depicting a first start marker and a first end marker corresponding to a period of execution of the first stored media file;

receiving a first input identifying a second stored media file and targeting the second stored media file to a second visual position on the timeline;

displaying on the timeline the second stored media file and a second start marker and a second end marker corresponding to a period of execution of the second stored media file;

executing the first stored media file and the second stored media file according to a temporal relationship as depicted by the first and second start and end markers on the timeline;

receiving a second input targeting the displayed first stored media file for deletion from the timeline;

displaying a message that the targeted first stored media file will be deleted from the timeline;

receiving a second input confirming deletion of the first stored media file from the timeline;

deleting the first stored media file from the timeline;

displaying a message that the targeted first stored media file will be deleted from storage; and within a predetermined period of time, deleting the targeted first stored media file from storage.

2. A method as in claim 1, wherein the second start marker is arranged on the timeline between the first start marker and the second start marker so that the first and second stored media files are simultaneously executed during an overlap period of execution.

3. A method as in claim 2, wherein the first stored media file comprises video media and the second stored media file comprises audio media.

4. A method for creating and displaying a multimedia presentation on a portable media device using a plurality of separate electronic media files, the method comprising:
displaying a timeline on a display screen of the portable media device;
displaying on the display screen a plurality of icons corresponding to a plurality of visual media files;
receiving a first visual input identifying a first visual media file;
receiving a second visual input targeting the first visual media file to a first visual position on the timeline;
displaying a first visual media segment on the timeline, the first visual media segment corresponding to the first visual media file, the first visual media segment having a discrete first visual media start marker and end marker depicted on the timeline;
displaying a plurality of icons corresponding to a plurality of audio media files;
receiving a first audio input identifying a first audio media file;
receiving a second audio input targeting the first audio media file to a first audio position on the timeline;
displaying a first audio media segment on the timeline simultaneously with the first visual media segment, the first audio media segment corresponding to the first audio media file, the first audio media segment having a discrete first audio media start marker and end marker depicted on the timeline, the first audio media segment at least partially overlapping the first visual media segment on the timeline; and
executing the first visual media file and first audio media file in accordance with the depiction of the first visual media segment and the first audio media segment on the timeline, comprising displaying on the display device a first visual media associated with the first visual media file over a period of time corresponding to the first visual media start and end markers, and playing on an audio device of the portable media device a first audio media associated with the first audio media file over a period of time corresponding to the first audio media start and end markers so that the first audio media is played simultaneously with display of at least a portion of the first video media.

5. A method as in claim 4 additionally comprising electronically saving a timeline file identifying the first visual media file associated with the first video media segment, the first audio media file associated with the first audio media segment, and the temporal association of the segments along the timeline.

6. A method as in claim 4 additionally comprising adding a tag to the first audio media file associating the first audio media file with the first video media file.

7. A method as in claim 4, wherein the first audio media start marker is at the same position along the timeline as the first visual media start marker.

8. A method as in claim 7, wherein the first audio media end marker is at a different position along the timeline than is the first visual media end marker.

9. A method as in claim 4 additionally comprising receiving a third audio input identifying a second audio media file, receiving a fourth audio input targeting the second audio media file to a second audio position on the timeline, displaying a second audio media segment on the timeline, the second audio media segment corresponding to the second audio media file and having a second audio media start marker and end marker, the second audio media segment at least partially overlapping the first visual media segment on the timeline.

10. A method as in claim 9, wherein the second audio media segment overlaps a portion of the first audio media segment along an audio overlap portion of the timeline.

11. A method as in claim 10 additionally comprising executing the second audio media file and the first audio media file so that the first and second audio media files are simultaneously played on the audio device of the portable media device during the audio overlap portion of the timeline.

12. A method as in claim 4 additionally comprising receiving a first timeline input and displaying an indicator, and further comprising receiving a temporal input adjusting the position along the timeline of one or more of the start or end markers of the first visual media segment and first audio media segment.

13. A method as in claim 4, wherein the first visual media file comprises a video file.

14. A method as in claim 4, wherein the first visual media file comprises one or more still photographs.

15. A method as in claim 4, wherein the first visual media file comprises one or more maps.

16. A method as in claim 15, wherein the first audio media file comprises verbal commentary about locations on the one or more maps.

17. A method as in claim 4, wherein the first visual media file comprises a plurality of graphic slides.

18. A method as in claim 17, wherein the first audio media file comprises verbal commentary concerning one or more of the plurality of graphic slides.

19. A method as in claim 4, wherein the first video media file is stored on the portable media device.

20. A method as in claim 4, wherein the first video media file is stored on a server remote from the portable media device, and additionally comprising receiving the first video media file via a wireless transmission.

* * * * *